United States Patent [19]

Sun

[11] Patent Number: 5,287,688
[45] Date of Patent: Feb. 22, 1994

[54] RAKE

[76] Inventor: Han-Chin Sun, No. 43, Ta-An Rd., San-An Li, Tien-Chung Chen, Changhua Hsien, Taiwan

[21] Appl. No.: 23,924

[22] Filed: Feb. 26, 1993

[51] Int. Cl.⁵ .............................................. A01D 7/06
[52] U.S. Cl. .................................................. 56/400.19
[58] Field of Search ............ 56/400.19, 400.01, 400.04, 56/400.18

[56] References Cited

U.S. PATENT DOCUMENTS

| | | | |
|---|---|---|---|
| 3,394,536 | 7/1968 | Hanne | 56/400.18 |
| 4,414,797 | 11/1983 | Archer | 56/400.19 |
| 5,144,791 | 9/1992 | Sun | 56/400.04 |
| 5,182,899 | 2/1993 | Sun | 56/400.19 X |

*Primary Examiner*—Terry Lee Melius
*Attorney, Agent, or Firm*—Marshall & Melhorn

[57] ABSTRACT

The rake includes a flat rake body with a flared portion provided with a plurality of prongs and a head portion opposite to the flared portion. The flat rake body has a first slot formed adjacent to a free end thereof and a second slot which has a second length that is shorter than a first length of the first slot and which is spaced from the first slot in a parallel manner. The rake further includes a resilient fastening unit that has a first inverted U-shaped member with two legs, a second inverted U-shaped member that is smaller than the first U-shaped member and that has two legs, and a connecting rod which interconnects one of the legs of the first and second U-shaped members. Each of a remaining one of the legs of the first and second U-shaped members has an extension that extends toward one another and that defines cooperatively a clearance therebetween. The two legs of the first and second U-shaped members respectively define first and second distances which are correspondingly equal to the first and second lengths of the first and second slots.

4 Claims, 3 Drawing Sheets

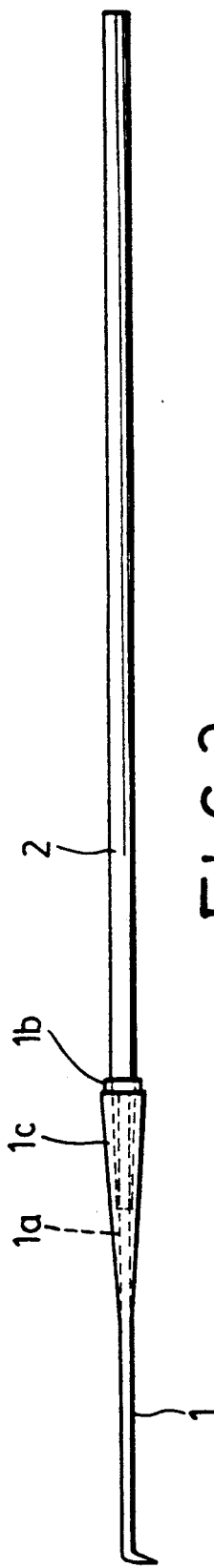
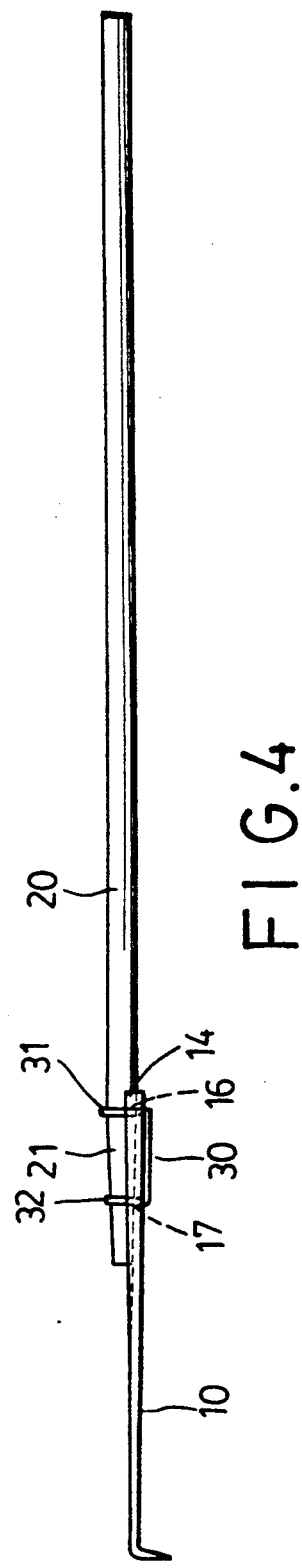

RAKE

BACKGROUND OF THE INVENTION

1. Field of the Invention

The invention relates to a rake with a rake body and a handling rod, more particularly to a rake with an improved fastening relationship of the handling rod to the rake body.

2. Description of the Related Art

A rake is used for drawing together fallen leaves, for smoothing soil, and for moving haystacks. Referring to FIG. 1, a conventional rake includes a wooden rod (2) and a rake body (1). The rake body (1) has a flared portion (1d) provided with a plurality of prongs (1e) and a head portion (1a) opposite to the flared portion (1d). The head portion (1a) has a blind connecting tube (1b) for receiving detachably one end of the wooden rod (2) and a pair of reinforcing ribs (1c) for strengthening the head portion (1a). When storing a plurality of conventional rakes, the rake bodies (1) are detached from the wooden rods (2) and are stacked in order to minimize storing space. The rake bodies (1) can not be stacked properly because the blind connecting tube (1b) and the reinforcing ribs (1a) project beyond a flat surface of the rake body (1), thus preventing an even stacking of the rake bodies (1).

SUMMARY OF THE INVENTION

The main object of the present invention is to provide a rake that includes a flat rake body and a wooden rod which can be disassembled from the flat rake body so that a plurality of the flat rake bodies can be properly stacked so as to minimize the required storing space.

According to the present invention, the rake includes a flat rake body that has a flared portion provided with a plurality of rake prongs and a head portion opposite to the flared portion. An imaginary line extends from the head portion to the flared portion so as to divide the flat rake body into two symmetrical parts. The flat rake body further has a first elongated slot transverse to the imaginary line and adjacent to a free end of the head portion and a second elongated slot with a second length which is shorter than a first length of the first slot. The second slot is spaced from and is parallel to the first slot. The second slot is transverse to the imaginary line and is disposed farther from the free end of the head portion than the first slot. The rake further includes a resilient fastening unit that has a first inverted U-shaped member with two legs, a second inverted U-shaped member which is smaller than the first inverted U-shaped member in size and which has two legs, and a connecting rod which interconnects one of the legs of the first U-shaped member to one of the legs of the second U-shaped member. Each of the other one of the legs of the first and second inverted U-shaped members has an extension that extends toward one another and that defines cooperatively a clearance therebetween. The two legs of each of the first and second inverted U-shaped members are respectively spaced by first and second distances. The first and second distances are respectively equal to the first and second lengths of the first and second inverted U-shaped members. When the resilient fastening member is mounted to the flat rake body, the first and second inverted U-shaped members extend through the first and second slots beyond one face of the flat rake body. A wooden rod with a tapered end can be inserted through the first and second inverted U-shaped members so as to fasten the wooden rod thereto.

The resilient fastening unit is used to fasten the wooden rod on the flat rake body. Therefore, the flat rake body does not require a blind hollow tube formed in the conventional rake. Thus, the raw material for making the blind hollow tube can be saved according to the present invention.

The flat rake body has pointed projections formed thereon which serve as additional fastening elements for the rake.

The first and second inverted U-shaped member provide an increasing fastening force to the wooden rod if a greater length of the wooden rod is inserted therethrough.

BRIEF DESCRIPTION OF THE DRAWINGS

Other features and advantages of the present invention will become more apparent in the following detailed description of the preferred embodiments with reference to the accompanying drawings, in which:

FIG. 2 shows a side view of the conventional rake;

FIG. 4 is a side view of the rake according to the present invention.

DETAILED DESCRIPTION OF THE PREFERRED EMBODIMENT

Figure 1:
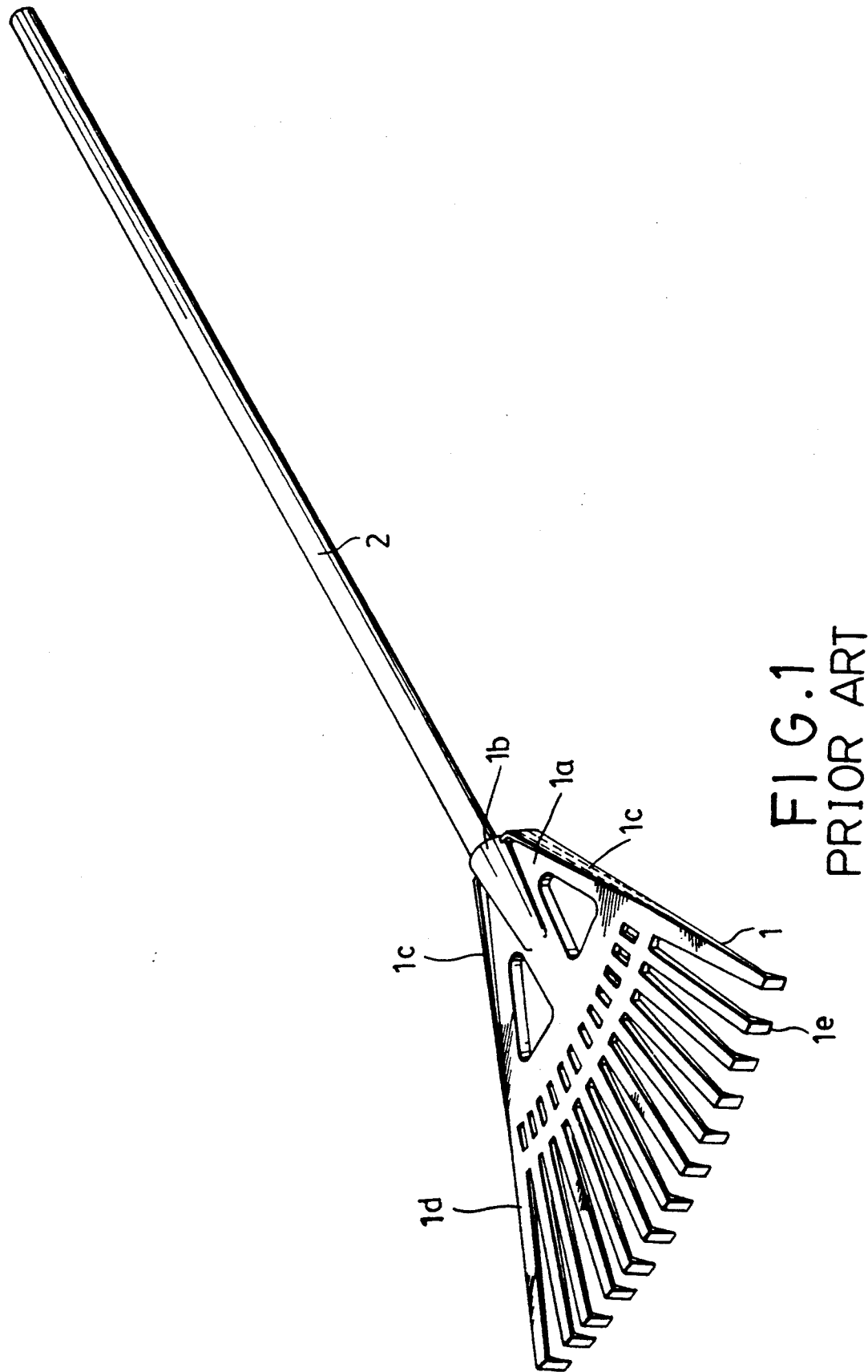
FIG. 1 shows a perspective view of a conventional rake.
Figure 3:
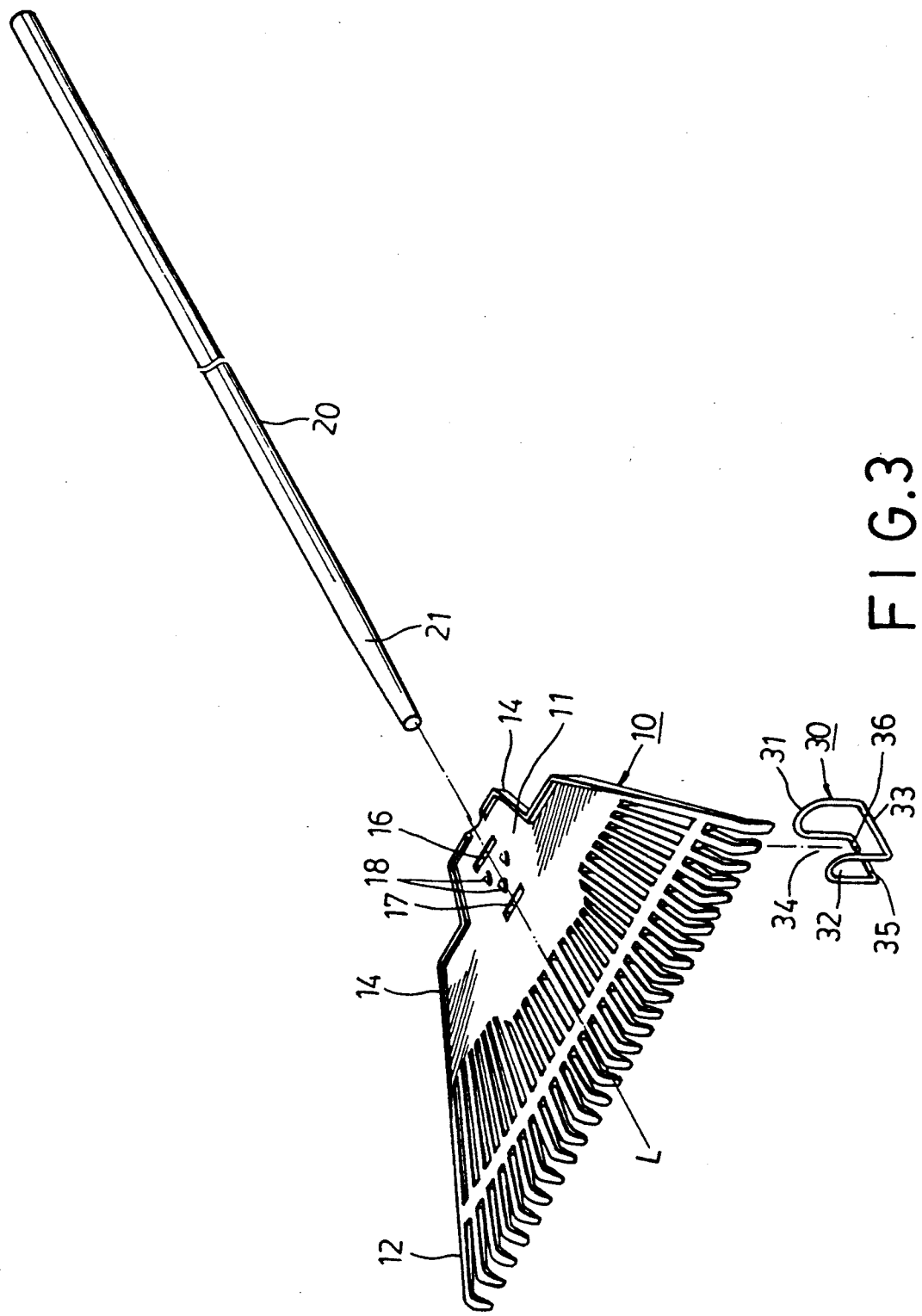
FIG. 3 shows an exploded view of a rake according to the present invention.

Referring to FIG. 3, a rake of the present invention is shown to comprise a flat rake body (10) which is made of plastic, an elongated wooden rod (20) and a resilient fastening unit (30) which is made of metal.

The flat rake body (10) includes a flared rake portion provided with a plurality of rake prongs (12) and a head portion (11) opposite to the flared portion. An imaginary line (L) is drawn across the flat rake body (10) to divide the same into two symmetrical parts. The head portion (11) has a pair of reinforcing ribs (14) formed along the periphery of the same and an elongated first slot (16) transverse to the imaginary line (L) and adjacent to a free end of the head portion (11). The head portion (11) further has an elongated second slot (17) which has a second length that is shorter than a first length of the first slot (16) and which is spaced from and parallel to the first slot (16). The second slot (17) is transverse to the imaginary line (L) and is disposed farther from the free end of the head portion (11) than the first slot (16). A plurality of pointed projections (18) are formed on the flat rake body (10) between the first and second slots (16,17) and extend inclinedly toward the flared portion of the flat rake body (10).

The resilient fastening unit (30) includes a first inverted U-shaped member (31) with two legs, a second inverted U-shaped member (32) with two legs, the second inverted U-shaped member (32) being smaller than the first U-shaped member (31), and a connecting rod (33) which interconnects one of the legs of the first inverted U-shaped member (31) and one of the legs of the second inverted U-shaped member (32). Each of the other one of the legs of the first and second inverted U-shaped members (31, 32) has an extension (35, 36) which extends toward one another and which defines cooperatively a clearance (34) therebetween.

When the resilient fastening unit (30) is mounted to the flat rake body (10), the inverted first and second U-shaped members (31, 32) extend through the first and second slot (16, 17) beyond one face of the flat rake body (10), as shown FIG. 4.

The wooden rod (20) has a tapered end (21) which is inserted through the first and second inverted U-shaped members (31, 32) of the fastening unit (30). Insertion of the wooden rod (20) expands the legs of the first and second U-shaped members (31, 32) outward, which expansion is limited by the first and second slot (16, 17). The wooden rod (20) is thus fastened to the flat rake body (10). Under this condition, the pointed projections (18) of the flat rake body (10) engage the wooden rod (20).

Some of the advantages that result from the use of the rake of the present invention are as follows:

(1) Since the flat rake body of the rake of the present invention does not include a hollow connecting tube at the head portion, the overall thickness of the flat rake body is reduced. Thus, a plurality of flat rake bodies can be stacked properly during storage at a minimum storing space. In addition, when the flat rake body is mass produced, a substantial amount of plastic can be saved.

(2) When the wooden rod is inserted deeply through the first and second U-shaped members, the first and second U-shaped members provide a greater clamping force. The pointed projections prevent disengagement of the wooden rod from the flat rake body when the wooden rod is pulled away from the flat rake body.

While a preferred embodiment has been described and illustrated, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A rake including a flat rake body having a flared portion provided with a plurality of rake prongs and a head portion opposite to said flared portion, said rake further including an elongated wooden rod which has a tapered end connected to said head portion;

the improvements comprising: said flat rake body having an imaginary line which extends centrally from said head portion to said flared portion so as to divide said flat rake body into two symmetrical parts, said flat rake body further having an elongated first slot formed transverse to said imaginary line and adjacent to a free end of said head portion and an elongated second slot transverse to said imaginary line and spaced from and parallel to said first slot, said first slot having a first length, said second slot having a second length that is shorter than said first length, said second slot being disposed farther from said free end of said head portion than said first slot; and a resilient fastening unit having a first inverted U-shaped member with two legs, a second inverted U-shaped member with two legs, said second inverted U-shaped member being smaller than said first inverted U-shaped member, and a connecting rod interconnecting one of said legs of said first inverted U-shaped member and one of said legs of said second inverted U-shaped member, each of the other one of said legs of said first and second inverted U-shaped members having an extension which extends toward one anther and which defines cooperatively a clearance therebetween, said two legs of each of said first and second inverted U-shaped members being respectively spaced by first and second distances which are respectively equal to said first and said second lengths so that said first and second inverted U-shaped members can extend through said first and second slots beyond one face of said flat rake body, and said tapered end of said wooden rod can be inserted into said first and second inverted U-shaped members when said first and second inverted U-shaped members are mounted to said flat rake body.

2. The rake as defined in claim 1, wherein said flat rake body further has a plurality of pointed projections formed on said one face of said flat rake body between said first and second slots, said pointed projections engaging said tapered end of said wooden rod.

3. The rake as defined in claim 1, wherein said flat rake body is made of plastic.

4. The rake as defined in claim 1, wherein said resilient fastening unit is made of metal.

* * * * *